July 7, 1964    W. E. BENNINGHOFF    3,140,378
APPARATUS AND METHOD FOR WELDING STRIPS ONTO A TUBE
Filed March 14, 1962
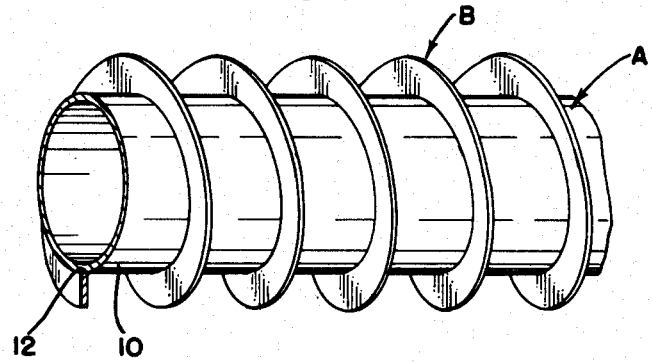
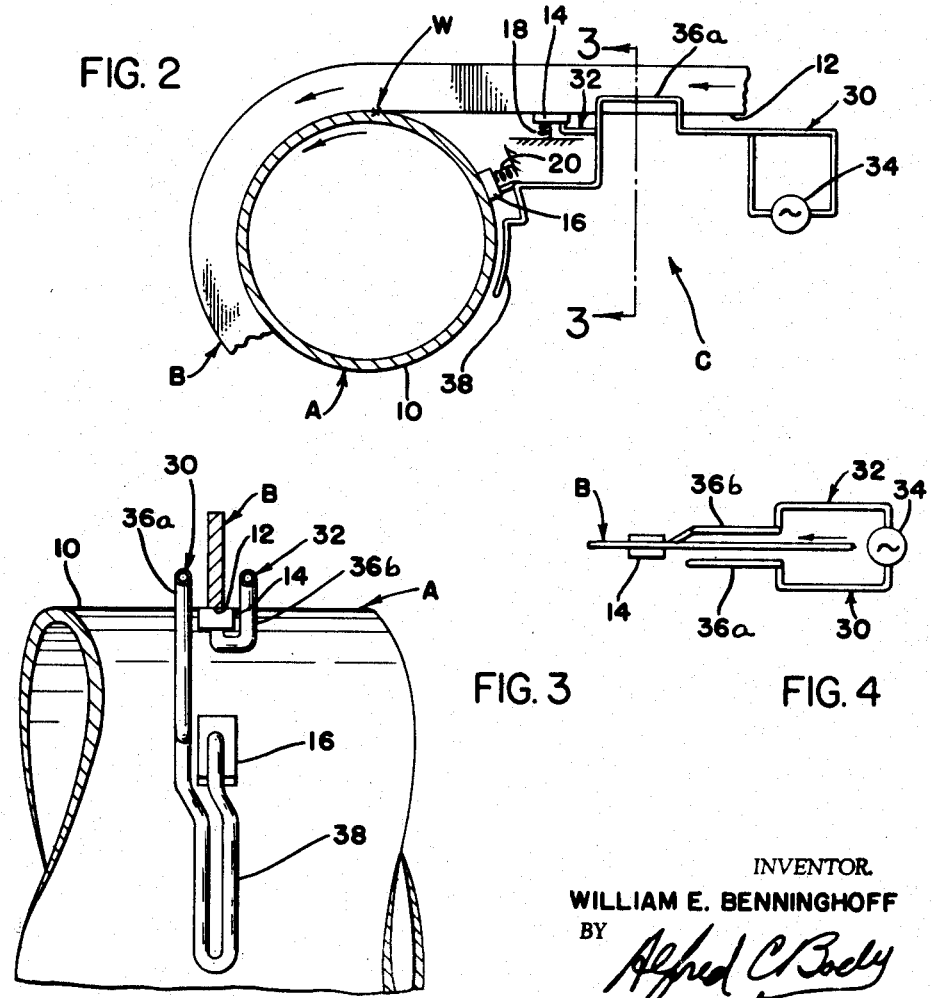
INVENTOR.
WILLIAM E. BENNINGHOFF
BY Alfred C. Body
ATTORNEY

3,140,378
APPARATUS AND METHOD FOR WELDING STRIPS ONTO A TUBE

William E. Benninghoff, Brecksville, Ohio, assignor to The Ohio Crankshaft Company, Cleveland, Ohio, a corporation of Ohio
Filed Mar. 14, 1962, Ser. No. 179,746
14 Claims. (Cl. 219—9.5)

This invention pertains to the art of welding and more particularly to an improved apparatus and method for welding a spirally wound strip of metal onto the outer surface of a metal tube.

The present invention is particularly applicable to welding a thin metal strip edgewise onto the outer surface of a metal tube as the strip is being spiralled onto the tube, and it will be discussed with particular reference thereto; however, it is to be appreciated that the invention has much broader applications and could be used for continuously welding a thin metal strip edgewise onto the outer surface of various metal members.

The production of numerous articles, such as heat exchanger units for air conditioners and radiators often requires great quantities of fluid conduits comprised of a tube having radially extending, heat conducting fins. These fins are usually constructed of separate metal strips mounted edgewise onto the outer surface of a thin metal tube. The most common methods for high production of such conduits are comprised of the following steps: spirally winding a strip of material edgewise onto the outer surface of a metal tube and continuously welding the strip onto the surface of the tube as it is being wound thereon. The temperature required for welding in these methods is provided by a high current which is passed between the strip and the tube after these members have been wound together. Often the heating current is introduced into the strip and tube by two spaced sliding contacts, one engaging the strip and the other engaging the tube wherein each contact is located ahead of the point of convergence be-between the strip and the tube. For simplification, the point of convergence of the tube and the strip is hereinafter referred to as the welding point, although it is realized that the actual point of convergence between the tube and the strip may be spaced slightly from the actual point at which the heating current fuses the strip onto the tube. These commonly used sliding contacts, although they provided acceptable weld joints, presented various problems. First, to provide a sound weld joint, it is known that the strip and tube should be heated to approximately the same temperature before they are forced together at the welding point. The temperatures of both the strip and the tube as they reach the welding point are determined by the $I^2R$ preheating effect caused by the conduction of the heating current from the sliding contact through the strip and tube and then through the welding point; therefore, the temperature of these converging members is determined by the spacing of the contacts from the welding point and the resistance of the material forming the members. Accordingly, since the resistance of the members varies from one job to another, the spacing of the sliding contacts with respect to the welding point had to be controlled very closely, which necessitated a complicated supporting structure for the contacts. This mounting structure had to be mounted within the limited space between the tube and the strip which presented added difficulties. As a further disadvantage, a complicated mechanism had to be provided for adjusting the position of the contact with respect to the welding point so that the proper welding temperatures were obtained at the welding point as the resistance of the welded members changed.

These disadvantages and others have been eliminated by the present invention wherein both heating of the tube and the thin strip wound thereabout is obtained without requiring a complicated supporting or adjusting arrangement for the sliding contacts.

In essence, the present invention contemplates an auxiliary preheating arrangement adjacent the sliding contacts to provide a convenient means for adjusting the total preheating of the strip and/or tube before these members reach the welding point. Accordingly, when it is necessary to change the amount of preheating of either the tube or the strip, the auxiliary preheating arrangement is easily adjusted to provide the necessary variations. This is substantially an improvement over the previous electrical contact arrangements for preheating and welding a spirally wound strip onto the outer surface of a tube.

In accordance with the present invention, there is provided a device for continuously welding a thin metal strip member edgewise onto the outer surface of a metal tube member as the strip member is being spirally wound thereon comprising a strip and a tube contact means each spaced from the point of convergence of the members for conducting a heating current through the members and across the point of convergence, and induction heating means adjacent at least one of the contact means and spaced from the point of convergence for preheating at least one of the members.

The primary object of the present invention is the provision of an apparatus for welding strip material edgewise onto the outer surface of a thin metal tube which apparatus is easily constructed, conveniently assembled in the relatively restricted area between the strip and the tube, and durable in operation.

Another object of the present invention is the provision of an apparatus for welding strip material edgewise onto the outer surface of a metal tube, which apparatus comprises a pair of electrical contacts one engaging the edge of the strip and the other engaging the tube and at least one induction coil for inductively preheating either the tube or the strip.

Still a further object of the invention is the provision of a welding apparatus of the type described having electrical contacts engaging the edge of the strip and the outer surface of the tube and which apparatus requires little, if any, adjustment of the contacts with respect to the point of convergence of the strip onto the tube when changes are made in the rate of welding or in the material used for either the tube or the strip.

Yet another object of the present invention is the provision of a resistance welding apparatus for welding a strip edgewise onto the outer surface of the tube which apparatus incorporates the conventional type of electrical contacts for engaging the strip and the tube with an improved means for adjusting the amount of preheating wherein these contacts require a relatively simple mounting structure and need no complicated mechanism for adjusting their position with respect to the welding point.

Another object of the invention is the provision of a resistance welding apparatus for welding a strip edgewise onto the outer surface of a tube which apparatus incorporates the conventional sliding electrical contacts for engaging the tube and the strip in combination with an induction means for adjusting the amount of preheating wherein these contacts need not be specially dimensioned to provide proper preheating for variations in the welding conditions.

Still a further object of the present invention is the provision of a resistance welding apparatus of the type described wherein the sliding contacts are mounted to preheat both the strip and the tube to the proper temperature as they converge without requiring complex configuration of the sliding contacts or their mounting arrangement.

Another object of the present invention is the provision of a method for welding strip material edgewise onto the outer surface of a metal tube, which method comprises a relatively non-adjustable preheat step and an adjustable preheat step.

These and other objects and advantages will become apparent from the following description used to illustrate the preferred embodiment of the invention as read in connection with the accompanying drawing in which:

FIG. 1 is a pictorial view showing a thin metal strip welded edgewise onto the outer surface of a metal tube;

FIG. 2 is a partial, cross sectional end view illustrating the preferred embodiment of the present invention;

FIG. 3 is a partial sectional view taken along line 3—3 of FIG. 2; and

FIG. 4 is a fragmentary plan view.

Referring now to the drawings wherein the showings are for the purpose of illustrating a preferred embodiment of the invention only, and not for the purpose of limiting same, FIG. 1 shows a metal tube A having an outer surface 10 and a thin metal strip B having an edge 12 which is weldably joined onto the outer surface 10. In the preferred embodiment, strip B is spirally wound around the outer surface 10 of tube A to present a series of radially extending fins which adapt the tube A for use in a variety of devices. For instance, tube A with the outer strip B is particularly adapted for use in heat exchanger units wherein heat of the fluid flowing through tube A is dissipated by conduction through the spirally arranged strip B.

Many production methods have been provided for welding strip B onto the outer surface of tube A; and the more successful of these methods comprise essentially the steps of rotating tube A about its longitudinal axis, moving the rotating tube axially forward at a predetermined rate along a fixed path, feeding the strip B transversely onto the surface of the rotating tube so that the axial movement of the tube creates the spiral configuration of the strip and causing a heating current flow through the strip, the tube and the point at which the strip converges with the tube surface. The spacing between the separate turns of the strip B, of course, is determined by the speed of rotation and axial rate of movement of tube A. The present invention is directed to an improvement on the method as above described which greatly simplifies the mechanism or apparatus for introducing the welding current into the strip and tube.

Referring to FIG. 2, a preferred embodiment of the present invention is disclosed wherein the welding apparatus C for introducing a heating current into the strip and the tube comprises, essentially, a sliding contact 14 engaging the edge 12 of strip B and contact 16 engaging the outer surface 10 of tube A wherein these contacts are spaced ahead of the point of convergence between the strip and the tube which point, for simplicity, is designated as welding point W. It is realized that the point of convergence may not correspond exactly with the welding point W which is the point where the current flowing between the strip and the tube fuses these members; however, in practice, there is only a slight spacing, if any, between these points and they can be assumed to coincide for the purpose of describing the preferred embodiment of this invention. The contacts 14, 16 are shown in the preferred embodiment as being in sliding engagement with the strip B and the tube A; however, it is within the contemplation of the invention to substitute rolling contacts for the sliding contacts 14, 16 without departing from the spirit of the invention. Contacts 14, 16 are biased against the edge 12 and the surface 10 and, in the preferred embodiment, these means are disclosed as coil springs 18, 20 which must be insulated one from the other to prevent establishment of an electrical circuit through the springs and between the contacts. Electrically connected to the contacts 14, 16 are appropriate conductors 30, 32 respectively which, in practice, are formed of copper wires and are electrically connected to the output terminals of an appropriate alternating current source, such as alternator 34, which, in practice, produces a current having a frequency between 1 and 450 kc.

As so far described, the welding apparatus C does not differ substantially from the prior welding apparatus as described above; however, in these prior apparatus it was common to use either a D.C. or A.C. supply current for welding the strip onto the tube. Accordingly, as the tube A was rotated to feed strip B along the surface 10, a current was passed from a contact similar to contact 14 through the strip, the welding point W, the tube A and back to a contact similar to contact 16. In this manner, the strip was welded edgewise onto the surface of the tube. To obtain a proper weld joint, it was advisable, if not essential, to preheat the strip and tube before they converged at point W and the amount of preheating was governed by the spacing of the contacts 14, 16 ahead of the welding point W. In the prior welding apparatus, adjustment of the spacing between the welding point W and the contacts changed the amount of preheating because such adjustment changed the length of the current path to the welding point. Accordingly, in these prior apparatus the preheating of the two members could be adjusted only by such a method as changing the spacing between the contacts 14, 16 and point W. Whenever one of the welding conditions was changed, such as changing the welding speed, it was necessary to readjust the position of the contacts with respect to the welding point W. This adjustment could not be predicted in advance. Consequently, it was necessary to make the adjustment by trial and error methods. To facilitate such adjustments, complicated mechanisms had to be provided for supporting the contacts and for allowing this adjustment. The present invention is directed to an improvement over the prior apparatus which eliminates these disadvantages and will be hereinafter described in detail.

In the preferred embodiment disclosed in FIGS. 2–3, the improved welding apparatus C comprises, in addition to sliding or rotating contacts 14, 16, an induction coil 36 having transversely spaced legs 36a and 36b juxtapositioned on opposite sides of strip B and adjacent the lower edge 12. As shown, legs 36a, 36b may be formed from spaced lengths of the conductors 30, 32 in side-by-side relationship; therefore, the induction coil 36 is in electrical series with the alternator 34 and contacts 14, 16. Adjacent the outer surface 10 of tube A there is provided another induction coil 38 formed from conductor 30 and spaced only slightly from the surface 10. According to the preferred embodiment, the induction coil 38 is a single narrow loop of wire having a contour substantially matching the outer contour of the surface 10; however, a variety of structural changes could be made such as providing two branches as disclosed in connection with induction coil 36. As in the case of induction coil 36, induction coil 38 is in series between the contact 16 and the alternator 34. FIG. 3 shows that the induction coils 36 and 38 may be constructed in two or more branches as provided adjacent strip B or in only one loop as provided adjacent to tube A. In reality, the branches or legs 36a, 36b provide better preheating of strip B because they are positioned on opposite sides of edge 12; however, due to the longitudinal continuity of surface 10 it would be impossible to place legs of the induction coil on opposite sides of the tube A.

In operation, alternator 34 generates an alternating current which is conducted through conductors 30, 32 to the contacts 14, 16. Thereafter, the current passes through strip B and tube A by way of the welding point W. When high frequency is provided, the proximity effect between the current in the tube and the current in the strip causes these currents to gather along the edge 12 and that portion of the tube directly beneath the strip. Current flow along edge 12 and surface 10 causes an I²R heating which preheats these members before they converge at W. To eliminate the necessity for complicated contact supports the present invention utilizes the induction coils 36, 38 to inductively heat the portion of the strip and tube in proximity with these coils. This preheating is accomplished by the I²R heating effect caused by the flow of currents resulting from the potential difference induced into these members by the respective coil. In this manner, the strip and the tube may be preheated by not only the current flowing between contacts 14, 16, but also, by the induction heating effect under the coils 36, 38. The temperature of the tube and strip as they reach point W may be changed by varying the heating effect of the induction coils without substantial variation in the position of contacts 14, 16. Consequently, the need for elaborate mounting and adjusting mechanisms is eliminated and the complexity of welding apparatus C is substantially reduced while the preheating of the strip and tube is accurately controlled.

Essentially, the edge of the strip B is inductively preheated to a temperature somewhat below the welding temperature of the strip material by the adjustable coil 36. Thereafter, conduction of current through the strip by the contact 14 further preheats the strip to substantially the welding temperature. The amount of inductive preheating can be varied to give the proper temperature at welding point W without adjustment of the position of contact 14. This same basic concept is utilized in preheating the tube A with the coil 38.

Modifications may be made in the welding apparatus C without departing from the intended spirit and scope of the present invention. For instance, the induction coils 36, 38 may be energized in parallel with contacts 14, 16 by providing separate leads to the alternator 34. It is also within the scope of the invention to provide separate induction coils and a power source for energizing these coils. In this manner, it would be possible to provide D.C. current through the contacts 14, 16 while energizing separate coils 36, 38 by high frequency source. Further, the contacts 14, 16 may be replaced by stationary induction heating coils to coact with coils 36, 38 for raising the temperature of the tube and strip to the welding temperature. Various other changes could be suggested within the intended scope of the invention as defined in the appended claims.

Having thus described my invention, I claim:

1. An apparatus for continuously welding a first and second member moving in substantially the same direction and converging at a point, comprising a contact abutting each of said members and spaced from said point, an induction coil means close spaced from said first member and spaced from said point, power means for causing a heating current to flow through said contacts, said members, and said point to weld said members as they converge, and a high frequency power means for energizing said coil means to inductively preheat said first member before said member reaches said point.

2. An apparatus as defined in claim 1 wherein said contact abutting said first member is positioned between said point and said induction coil means.

3. An apparatus as defined in claim 1 including a second induction coil means close spaced from said second member and spaced from said point and means for energizing said second coil by said high frequency power means.

4. An apparatus as defined in claim 3 wherein said contact abutting said first member is positioned between said point and said first-mentioned induction coil means and said contact abutting said second member is positioned between said point and said second induction coil means.

5. An apparatus for continuously welding a metal strip member edgewise onto the outer surface of a metal cylinder member as the strip is spirally wound thereon, the apparatus comprising in combination: a strip and a cylinder contact means each means spaced from the point of convergence of said strip and said cylinder for conducting a heating current through said point, an induction heating coil adjacent one of said contact means but spaced from said point of convergence for preheating one of said members.

6. An apparatus as defined in claim 5 including a high frequency power means and means for electrically connecting said induction coil and said contact adjacent said coil in electrical series with each other and with said high frequency power means.

7. An apparatus as defined in claim 5 including means for connecting one of said contact means in series with a high frequency power source and means for connecting said induction coil in series with said power source.

8. An apparatus as defined in claim 5 including means for connecting both of said contact means in series with a first power source and means for connecting the induction coil in series with a high frequency alternating current power source.

9. An apparatus as defined in claim 8 wherein said first power source comprises a means for providing direct current to said contact means.

10. An apparatus as defined in claim 5 wherein said heating coil is spaced from said point a greater distance than said one contact means.

11. An apparatus as defined in claim 5 including a second induction heating coil adjacent the other of said contact means but spaced from said point for preheating the other of said members.

12. An apparatus for continuously welding a thin metal strip edgewise onto the outer surface of a metal tube as said strip is spirally wound thereon, the apparatus comprising in combination: a strip and tube contact means each contact means being spaced from the point of convergence of the strip and the tube for conducting a heating current through said point, a first induction coil means spaced from said strip contact and said point for inductively preheating said strip, a second induction coil means spaced from said tube contact and said point for inductively preheating said tube, a high frequency power means for energizing said coil means, and a power means for directing a heating current through said contact means and said point.

13. A method for continuously welding a thin metal strip edgewise onto the outer surface of a metal tube as said strip is spirally wound thereon, comprising the following steps: inductively preheating the edge of said strip to a temperature below the welding temperature of said strip; thereafter conductively preheating the edge of said strip to substantially the welding temperature of said strip; conductively preheating said tube to substantially the welding temperature of said tube; and passing a welding current between said strip and tube to fuse said strip edgewise onto said tube.

14. The method as defined in claim 13 including the added step of inductively preheating said tube to a temperature below the welding temperature of said tube before said tube is conductively preheated.

References Cited in the file of this patent

UNITED STATES PATENTS

| | | |
|---|---|---|
| 1,909,704 | Morseth | May 16, 1933 |
| 2,107,831 | Morseth | Feb. 8, 1938 |